United States Patent [19]
Linton et al.

[11] Patent Number: 5,617,899
[45] Date of Patent: Apr. 8, 1997

[54] ORIFICE METERING APPARATUS AND METHOD OF FABRICATING SAME

[75] Inventors: Lloyd H. Linton, Montgomery; Lester W. Richter, Kingwood, both of Tex.

[73] Assignee: Dresser Industries, Dallas, Tex.

[21] Appl. No.: 410,674

[22] Filed: Mar. 27, 1995

[51] Int. Cl.$^6$ ...................................................... F15D 1/02
[52] U.S. Cl. ............................... 138/44; 138/40; 138/45
[58] Field of Search .................................. 138/44, 45, 94, 138/94.3, 37; 277/71–74; 251/175, 182, 193, 210, 206

[56] References Cited

U.S. PATENT DOCUMENTS

| | | |
|---|---|---|
| 3,817,287 | 6/1974 | Aitken . |
| 4,014,366 | 3/1977 | Critendon . |
| 4,410,010 | 10/1983 | Van Scoy . |
| 4,444,224 | 4/1984 | Geisow . |
| 4,478,251 | 10/1984 | Sanchez et al. . |
| 4,503,594 | 3/1985 | Gall et al. . |
| 5,042,531 | 8/1991 | Foster et al. . |
| 5,069,252 | 12/1991 | Kendrick et al. . |
| 5,094,272 | 3/1992 | Foster et al. . |
| 5,148,829 | 9/1992 | Deville . |
| 5,155,919 | 10/1992 | Thomas . |
| 5,181,542 | 1/1993 | Wass et al. . |
| 5,226,240 | 7/1993 | Stark . |
| 5,305,796 | 4/1994 | Klak . |
| 5,327,938 | 7/1994 | Crane . |
| 5,379,522 | 1/1995 | Jacobs . |

*Primary Examiner*—David Scherbel
*Assistant Examiner*—Patrick F. Brinson
*Attorney, Agent, or Firm*—Haynes and Boone, L.L.P.

[57] ABSTRACT

An apparatus for metering fluid flow through a pipeline in which a housing is provided for connecting to the pipeline and which defines a chamber through which fluid from said pipeline flows. A mounting surface is formed in the chamber and a carrier assembly is disposed in the chamber for defining an orifice and a second mounting surface which engages the first mounting surface to align the orifice with the pipeline.

19 Claims, 2 Drawing Sheets

ORIFICE METERING APPARATUS AND METHOD OF FABRICATING SAME

BACKGROUND OF THE INVENTION

This invention relates to an orifice metering apparatus and a method of fabricating same and, more particularly, to such an apparatus and method in which an orifice is centered in a substantially coaxial relation in a pipeline to obtain precise fluid flow measurements.

Through the oil and gas industry, these is a need for accurate, economical measurement of process fluids, such as natural gas, or the like, flowing through a pipeline. The most popular apparatus for realizing this is an orifice meter which is relatively versatile and low in cost compared to other flow meters.

In general, an orifice meter consists of a section of straight pipe which is inserted in the pipeline and which contains a constrictive device, usually in the form of an orifice plate, which reduces the cross-sectional area of the flow stream. In order to maintain a steady flow of fluid throughout the pipeline, the velocity of the fluid must increase through the orifice. This increase in kinetic energy must be accompanied by a decrease in another form of energy which is indicated by a decrease in static pressure or differential pressure. The differential pressure between the upstream and downstream section of the orifice plate, due to the energy exchange, can be used as a measure of the difference in fluid velocity between these sections and is the principle behind flow meters of this type. To this end, the differential pressure is sensed, and when combined with correction factors for the meter itself and the physical characteristics of the fluid being measured, allows computation of the rate of flow, usually by a chart recorder and/or flow computers.

Unfortunately, due to the relatively wide range of tolerances in the several parts making up a orifice meter, it is difficult to obtain flow measurements with a great deal of accuracy. Although this can be overcome by calibrating the meters, the calibration process is time-consuming and costly.

The above problems with orifice meters are compounded by recent regulations requiring, in certain circumstances, that orifice meters be constructed to much tighter dimensional and configurational requirements than in the past.

SUMMARY OF THE INVENTION

It is therefore an object of the present invention to provide an orifice metering apparatus in which an orifice plate is precisely located in a pipeline to enable fluid flow characteristics to be measured and determined with a relatively high degree of accuracy.

It is a still further object of the present invention to provide an apparatus of the above type which does not require calibration.

It is a still further object of the present invention to provide a method of fabricating an orifice metering apparatus of the above type.

Towards the fulfillment of these and other objects, the orifice metering apparatus of the present invention includes a body member, or housing, which is adapted for connection in a pipeline and which defines a through bore through which the pipeline fluid flows. A mounting surface is provided in the interior of the housing and a carrier member is provided which receives an orifice plate and which defines a machined pad for engaging the mounting surface to locate the carrier member with respect to the bore. The bore can be machined in the same chuck set-up as the mounting surface and the machined pad of the carrier plate can be machined in the same chuck set-up as a shoulder on the carrier member that receives the orifice plate.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings wherein.

DESCRIPTION OF THE PREFERRED EMBODIMENT

Figure 1:
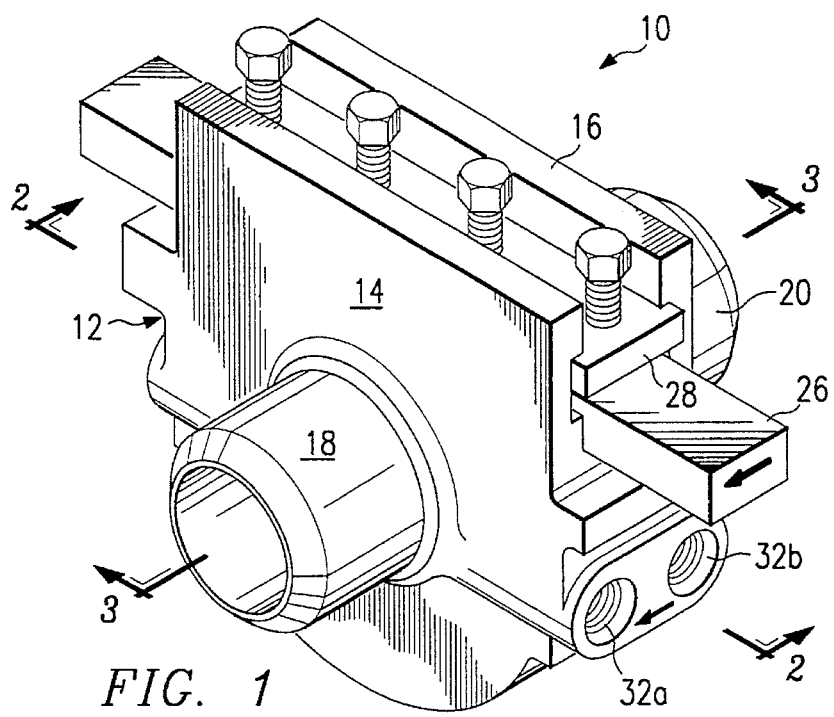
FIG. 1 is a perspective view of the orifice metering apparatus of the present invention.
Figure 2:
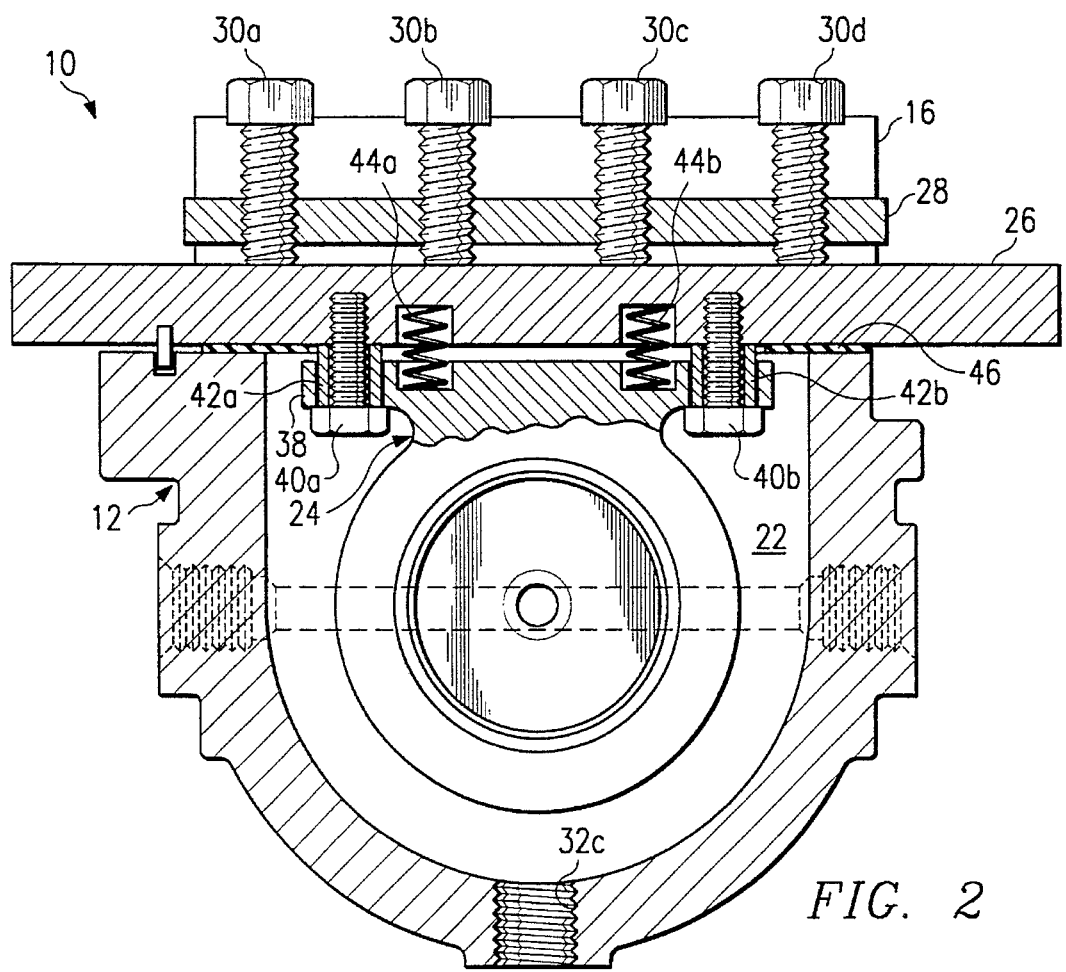
FIGS. 2 and 3 are cross-sectional views taken along the lines 2—2 and 3—3, respectively, of FIG. 1.
Figure 3:
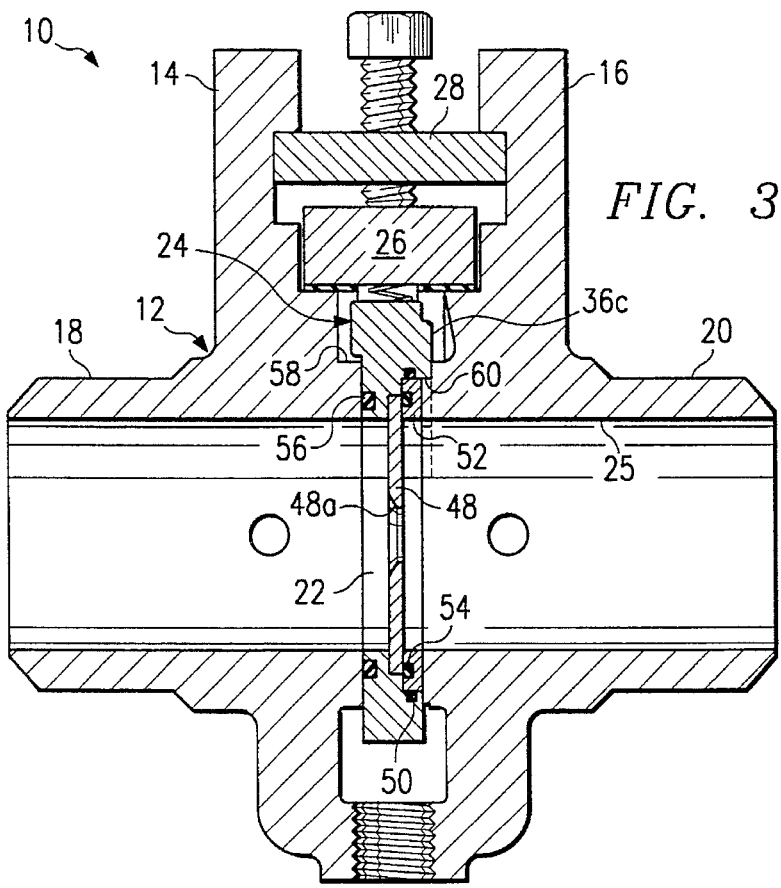

Referring to FIGS. 1–3 of the drawings, the reference numeral 10 refers, in general, to the orifice metering apparatus of the present invention which includes a housing, or body member, 12 having two side walls 14 and 16 and two outwardly-projecting necks 18 and 20 extending from the respective end walls thereof. The respective end portions of the necks 18 and 20 are beveled to enable them to be welded to two corresponding sections of a pipeline (not shown).

A chamber 22 (FIG. 2) is formed in the interior of the housing 12 and extends through an open end formed through the upper wall of the housing for receiving an orifice plate carrier assembly 24 that will be described in detail later. A continuous through bore 25 (FIG. 3) is defined by the necks 18 and 20 and the body member 12 through which fluid from the above-mentioned pipeline flows, as will be described. Preferably, the body member 12, including the side walls 14 and 16 and the necks 18 and 20, are formed from a single cast steel block with the bore 25 being formed by machining the block.

The sidewalls 14 and 16 of the housing 12 are extended beyond the upper portion of the chamber 22 and a seal bar 26 is located between the sidewalls and functions to seal off the upper portion of the chamber. Opposed notches, or grooves are formed in the opposed interior surfaces of the extended portions of the sidewalls 14 and 16, respectively, for receiving a locking bar 28 extending immediately above the seal bar 26. Four threaded bolts 30a–30d extend through corresponding threaded bores formed through the locking bar 28 and engage the upper surface of the seal bar 26 to secure the seal bar in the sealing position shown. Since the housing 12, the seal bar 26 and the locking bar 28 are all preferably fabricated from cast steel, and since the notches in the sidewalls 14 and 16 are relatively deep, the locking bar 28 secures the seal bar 26 in its sealing position despite high fluid pressures in the chamber 22.

Two pairs of threaded ports 32a and 32b (FIG. 1), are respectively formed through the end walls of the housing 12 for receiving instrumentation for determining flow rates, as will be described, and a drain port 32c (FIG. 2) is provided through the bottom wall of the housing for permitting draining of the chamber 22 and normally receives an externally threaded plug 34 (not shown) to close the port.

Figure 4:
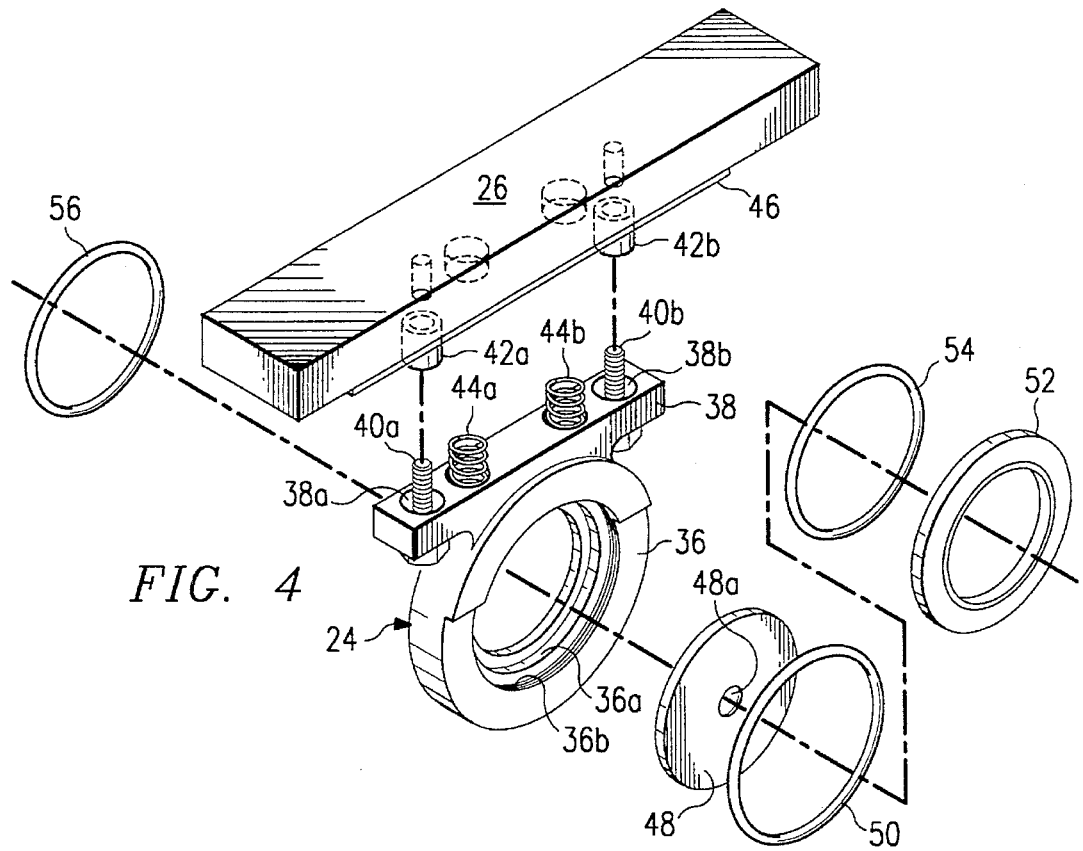
FIG. 4 is an exploded, perspective view of a portion of the apparatus of FIG. 1.

The carrier assembly 24 is also shown in FIG. 4 and is formed by a short cylinder member 36 having a bar-like flange 38 extending tangentially to the upper surface thereof and formed integrally therewith. A pair of bolts 40a and 40b extend through a corresponding pair of openings 38a and 38b formed in the flange 38 and into aligned threaded counterbores formed in the lower surface of the seal bar 26, as viewed in FIGS. 2 and 4. A pair of cylindrical spacers 42a and 42b extend in the openings 38a and 38b and around the respective shafts of the bolts 40a and 40b, respectively. The spacers 42a and 42b span the distance from the lower surface of the seal bar 26 to the respective heads of the bolts. The diameter of the enlarged openings 38a and 38b is greater than the outside diameter of the spacers 42a and 42b and the thickness of the flange 38 is slightly less than the length of the spacers 42a and 42b so that the flange 38, and therefore the carrier assembly 24 can "float" with limited horizontal and vertical movement, respectively, in the chamber 22, as viewed in FIG. 2. A pair of springs 44a and 44b extend in aligned counterbores formed in the seal bar 26 and the flange 38, respectively, in the assembled condition of the assembly 10 shown in FIGS. 2 and 3, and thus urge the flange, and therefore the carrier assembly 24, downwardly. A gasket 46 also extends between the seal bar 26 and the body member 12 and has appropriate openings formed therein through which the bolts 40a and 40b, the spacers 42a and 42b, and the springs 44a and 44b extend.

Referring to FIGS. 3 and 4, two counterbores are machined in the cylinder member 36 to form an inner shoulder 36a and an outer shoulder 36b. An orifice plate 48, having an outer diameter very slightly less than the diameter of the inner shoulder 36a, rests on the lip, or surface remaining after the counterbore forming the inner shoulder 36a is machined. The orifice plate 48 has a central opening 48a which forms a restriction in the bore 25 when inserted in the housing 12, as shown in FIG. 3. An O-ring 50 extends in a groove formed in the outer shoulder 36b and an annular retainer plate 52 rests on the lip, or surface remaining after the counterbore forming the outer shoulder 36b is machined, with the outer circumference of the retainer plate engaging the O-ring 50 in a friction fit. An O-ring 54 is provided in a circular groove (not shown) formed in one side, or face, of the retainer plate 52 and engages a corresponding portion of the orifice plate 44 in the assembled condition of FIG. 3. An O-ring 56 is provided in a groove formed on the opposite, outer face of the cylinder member 36. An arcuate locating pad 36c (FIGS. 3 and 4) is provided on the inner surface of the cylinder member 36, and is formed by appropriately machining the latter member.

As shown in FIG. 3, the body member 12 has two inwardly-projecting, relatively short necks 58 and 60 defining portions of the chamber 22 which are coaxial with the outwardly-projecting necks 18 and 20 and in alignment therewith. An arcuate shoulder is formed on the neck 60 and the remaining end portion of the neck extending from the shoulder defines a mounting surface for the carrier assembly 24. The lower, arcuate surface of the locating pad 36c corresponds to the above-mentioned remaining end portion of the neck 60 so that, in the assembled condition of the apparatus shown in FIG. 3, the lower surface of the locating pad 36c rests on the latter end portion of the neck 60.

In order to insure that the orifice plate 48, and therefore its opening 48a, is in a very precise concentric alignment with the bore 25 to provide accurate measurements, several surfaces of the components described above are machined with relatively high precision, i.e., with relatively low tolerances. These surfaces include the wall of the bore 25, the end portion of the neck 60, the shoulder 36a and the lower surface of the locating pad 36c. To further improve the concentricity, the bore 25 and the end portion of the neck 60 can be machined in the same chuck set-up, that is, during the machining operation in which these surfaces are formed, the chuck that secures the body member 12 during the machining operation is maintained at the same setting. Also, the chuck can be maintained at the same setting during the machining of the shoulder 36a and the lower surface of the locating pad 36c. Thus, any variations from the tolerances required to insure a relative precise machining operation will not be additive and will thus insure that concentricity is achieved.

In operation, the body member 12 is connected in the pipeline (not shown) which is to be tested, with the beveled end portions of the necks 18 and 20 being welded to corresponding sections of the pipeline. The orifice plate 48, the O-rings 50 and 54 and the retainer plate 52 are assembled in the carrier assembly 24 in the manner described above, and the assembly is inserted into the chamber 22 through its open, upper end as viewed in FIG. 3, until the lower surface of the locating pad 36c rests on the neck 60. The above-mentioned floating-type mounting of the carrier assembly 24 in the chamber 22, coupled with the action of the springs 44a and 44b against the carrier assembly enables the carrier assembly, and therefore the orifice plate 48, to be precisely located in the chamber 22 in alignment with the bore 25, with the O-rings 54 and 58 providing the proper fluid seals. The orifice 48a in the plate 48 forms a restriction in the chamber and thus causes a pressure drop across the plate. A differential pressure measuring device (not shown) is connected to the ports 32a and 32b to determine and measure the fluid flow through the pipeline in the manner described above. Of course, the carrier assembly can easily be removed from the chamber 22 for maintenance, to change the orifice plate, or the like.

Thus, the apparatus of the present invention enables the orifice plate 48 to be precisely located in the chamber 22 in alignment with said bore 25 to insure very high accuracy of the flow measurements without requiring calibration. Moreover, the apparatus is relatively simple to manufacture, assemble and use.

It is understood that modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. An apparatus for metering fluid flow through a pipeline, said apparatus comprising:
   a housing adapted to be connected to the pipeline and defining:
      a bore in alignment with said pipeline through which fluid from said pipeline flows,
      a chamber surrounding said bore, and
      a neck projecting inwardly towards said chamber and having a shoulder radially spaced from said bore; and
   an orifice plate assembly disposed in said chamber and defining an orifice in the path of said fluid as it passes through said bore, said assembly defining a mounting surface which engages said shoulder to align said orifice with said pipeline.

2. The apparatus of claim 1 wherein said mounting surface engages said shoulder to align said orifice with said pipeline in a direction perpendicular to the axis of said bore.

3. The apparatus of claim 1 wherein said housing has a first and second neck projecting outwardly therefrom and adapted to be connected to corresponding sections of said pipeline.

4. The apparatus of claim 1 wherein said orifice plate assembly comprises a carrier member, an orifice plate mounted in said carrier member and extending across said bore, and a retainer member for retaining said plate in said carrier member.

5. The apparatus of claim 4 wherein said mounting surface is formed on said carrier member and is in the form of an arcuate surface that engages said shoulder.

6. The apparatus of claim 4 further comprising a first sealing member extending between said retainer member and said orifice plate and a friction member extending between said retainer member and said carrier member.

7. The apparatus of claim 1 further comprising a locking mechanism for locking said orifice plate assembly in said chamber.

8. An apparatus for metering fluid flow through a pipeline, said apparatus comprising:

a housing adapted to be connected to the pipeline and defining:
      a bore in alignment with said pipeline through which fluid from said pipeline flows,
      a chamber surrounding said bore, and
      a first mounting surface radially spaced from said bore and extending parallel to said bore; and an orifice plate assembly disposed in said chamber and comprising:
      a carrier member having an arcuate surface that engages said first mounting surface to align said orifice with said pipeline,
      an orifice plate mounted in said carrier member, extending across said bore, and defining an orifice in the path of said fluid as it passes through said bore, and
      a retainer member for retaining said plate in said carrier member.

9. The apparatus of claim 8 wherein said surfaces engage to align said orifice with said pipeline in a direction perpendicular to the axis of said bore.

10. The apparatus of claim 8 wherein said housing has a first and second neck projecting outwardly therefrom and adapted to be connected to corresponding sections of said pipeline.

11. The apparatus of claim 8 wherein said housing has a neck projecting inwardly towards said chamber, said first mounting surface being defined by a shoulder formed on said neck.

12. The apparatus of claim 8 further comprising a first sealing member extending between said retainer member and said orifice plate and a friction member extending between said retainer member and said carrier member.

13. The apparatus of claim 8 further comprising a locking mechanism for locking said orifice plate assembly in said chamber.

14. An apparatus for metering fluid flow through a pipeline, said apparatus comprising:

a housing adapted to be connected to the pipeline and defining:
      a bore in alignment with said pipeline through which fluid from said pipeline flows,
      a chamber surrounding said bore, and
      a neck projecting inwardly towards said chamber and having a shoulder radially spaced from said bore; and means disposed in said chamber and defining an orifice in the path of said fluid as it passes through said bore, said means defining a mounting surface which engages said shoulder to align said orifice with said pipeline in a direction perpendicular to the axis of said bore.

15. The apparatus of claim 14 wherein said housing has a first and second neck projecting outwardly therefrom and adapted to be connected to corresponding sections of said pipeline.

16. The apparatus of claim 14 wherein said means comprises a carrier member, an orifice plate mounted in said carrier member and extending across said bore, and a retainer member for retaining said plate in said carrier member.

17. The apparatus of claim 16 wherein said mounting surface is formed on said carrier member and is in the form of an arcuate surface that engages said shoulder.

18. The apparatus of claim 16 further comprising a first sealing member extending between said retainer member and said orifice plate and a friction member extending between said retainer member and said carrier member.

19. The apparatus of claim 14 further comprising a locking mechanism for locking said means in said chamber.

* * * * *